United States Patent
Heil et al.

(10) Patent No.: US 6,173,374 B1
(45) Date of Patent: *Jan. 9, 2001

(54) SYSTEM AND METHOD FOR PEER-TO-PEER ACCELERATED I/O SHIPPING BETWEEN HOST BUS ADAPTERS IN CLUSTERED COMPUTER NETWORK

(75) Inventors: Thomas F. Heil, Fort Collins, CO (US); Martin H. Francis, Wichita, KS (US); Rodney A. DeKoning, Wichita, KS (US); Bret S. Weber, Wichita, KS (US)

(73) Assignee: LSI Logic Corporation, Milpitas, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/022,350

(22) Filed: Feb. 11, 1998

(51) Int. Cl.[7] .................................................. G06F 12/00
(52) U.S. Cl. ...................... 711/148; 711/147; 711/130; 711/153; 709/213; 709/214; 709/217; 709/212
(58) Field of Search ..................................... 711/147, 148, 711/114; 709/213, 214, 215, 232, 231, 201, 206, 212, 244, 249

(56) References Cited

U.S. PATENT DOCUMENTS

| | | | |
|---|---|---|---|
| 3,794,983 | * 2/1974 | Sahin | 340/172.5 |
| 4,539,655 | * 9/1985 | Trussell et al. | 364/900 |
| 4,698,753 | * 10/1987 | Hubbins et al. | 364/200 |
| 4,805,137 | * 2/1989 | Grant et al. | 364/900 |
| 4,935,894 | * 6/1990 | Ternes et al. | 364/900 |
| 5,210,828 | * 5/1993 | Bolan et al. | 395/200 |
| 5,410,654 | * 4/1995 | Foster et al. | 395/275 |
| 5,471,638 | * 11/1995 | Keeley | 395/800 |
| 5,499,384 | * 3/1996 | Lentz et al. | 395/821 |
| 5,522,050 | * 5/1996 | Amini et al. | 395/306 |
| 5,675,791 | * 10/1997 | Bhide et al. | 395/621 |

* cited by examiner

Primary Examiner—John W. Cabeca
Assistant Examiner—Kimberly McLean

(57) ABSTRACT

The present invention retrieves data across independent computer nodes of a server cluster by providing for I/O shipping of block level requests to peer intelligent host-bus adapters (hereinafter referred to as HBA). This peer-to-peer distribution of block I/O requests is transparent to the host. The HBA has the intelligence to decide whether to satisfy a block I/O request locally or remotely. Each HBA driver utilizes the $I_2O$ protocol, which allows peer-to-peer communication independent of the operating system or hardware of the underlying network. In a first embodiment of the present invention, local and remote storage channels, within a node, are supported by a single HBA. In a second embodiment of the present invention, local storage channels, within a node, are supported by one HBA, and the remote storage channel, within a node, is supported by a separate HBA.

31 Claims, 7 Drawing Sheets

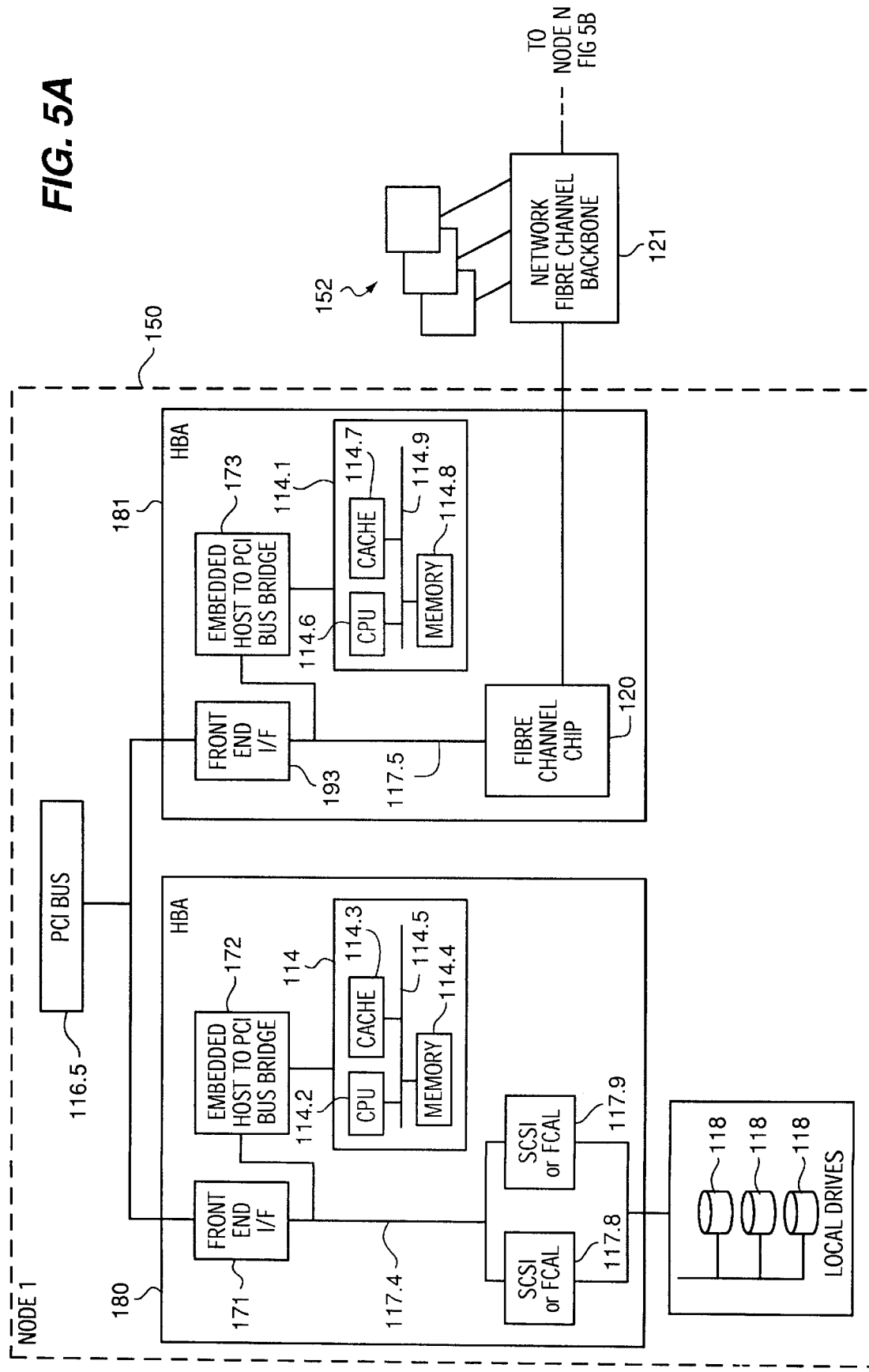

SYSTEM AND METHOD FOR PEER-TO-PEER ACCELERATED I/O SHIPPING BETWEEN HOST BUS ADAPTERS IN CLUSTERED COMPUTER NETWORK

BACKGROUND OF THE INVENTION

1. Field of the Invention

This invention relates to distribution of storage data within computer nodes of a clustered computing environment, and more particularly, to an apparatus and method for I/O request shipping operable using peer-to-peer communications within host bus adapters of the clustered systems.

2. Discussion of Related Art

A cluster is, in general, a collection of interconnected whole computers utilized as a single computing resource whereby a communication network is used to interconnect the computers within the cluster. A cluster typically contains several computers. From the viewpoint of a computer within this collection of computers, the rest of the computers and their respective attached resources are deemed remote, whereas its own attached resources are deemed to be local.

Resource sharing is one benefit of a computing cluster. A computer within the cluster can access the resources of another computer within the cluster, and the computers of the cluster can thereby share any resource in the cluster. Combining the processing power and storage resources of the cluster into one virtual machine increases the availability and capacity of resources within the cluster. For example, if one resource, such as a processor, in the cluster were to fail, another processor within the cluster could take over the load of the failed processor. To the requester, the failure of the processor is transparent because another peer processor services its request load.

A common application of such a clustered environment is for the sharing of disk storage resources. For example, in high volume transaction processing applications (e.g., a database transaction system), a large number of processors may be added to a computing environment all of which share access to common storage devices containing the shared database. The transaction processing load may therefore be distributed over a large number of processors operating in parallel to perform the requisite transactions. Problems arise where multiple computers, operating in parallel, share data and storage devices. Clearly, a level of coordination is required to assure that each of the computers is aware of updates in the storage devices made by others of the computers in the cluster. In environments that share common storage resources, two fundamental architectures have arisen to coordinate the shared access to storage devices: file level shared access control and block level shared access control. That is, information may be distributed between disks at the file level or at the block level.

Entire files may be distributed throughout a cluster's storage subsystem by storing the files on a local disk or storing the files on remote storage subsystems. Software executed by the host coordinates the communications between the host computer requesting the file and the local or remote storage subsystem containing the file. This software executed by the host is implemented within each host's operating system or can be a software layer operating on each host to coordinate access to the files.

As entire files may be distributed throughout a cluster's storage subsystem, a file can be partitioned into a plurality of individual blocks that can similarly be distributed throughout a cluster's storage subsystems. This allows the parts of the file to be concurrently accessed locally and/or remotely. Software executed by the host coordinates the communications between the host computer requesting the blocks and the local or remote storage subsystem containing the blocks. As previously stated, this software is presently implemented within each host's operating system or as a software layer operating on each host in a cooperative distributed manner.

Both block level distribution and file level distribution can be performed with physically shared disks. In a physically shared disk architecture, each node (computer) in the cluster has direct access to all the disks within the cluster to thereby provide "any-to-any" connectivity among hosts and disks. A layer of host software provides the coordination to allow hosts to access data from any disk within the cluster. One such example is the Oracle Parallel Database Server running in a DEC VAX/Alpha cluster.

The Oracle Parallel Database Server maintains the consistency of the database by utilizing a proprietary protocol, the distributed lock manager (DLM), to allow nodes to access the shared storage concurrently. Utilizing DLM software in a cluster of physically shared disks allows all computer nodes to have access to all disks directly through their own I/O subsystem so that each disk appears to be physically local. Each computer node can cache and/or lock shared disk-based structures utilizing the DLM software. For example, if one node wants blocks X, Y, and Z within disks A and B, it must first ask the DLM software for permission. The DLM will grant permission only after it has endured that blocks X, Y, and Z are current. The DLM ensures that if another node has made recent changes to blocks X, Y, and Z and locally cached the modifications, the DLM will ask it to flush the modifications to disks A and B first.

Physically shared disks are simple to manage, provide fast data access, and are the dominant approach in the market today. However in large configurations, expensive switches and multiplexing devices are required to maintain any-to-any connectivity between nodes. Due to the expensive switches and interconnects, this architecture is expensive to scale. In particular, each computer or disk added to such a physically shared disks architecture may require, in turn, addition of a larger, more complex, more costly switching or multiplexing devices.

Both block level distribution and file level distribution can also be performed with logically shared disks. In a logically shared disk architecture disks are not shared physically, but distributed across the nodes of the cluster, each node owning a subset of the total disks. File level shared access control or block level shared access control at the host level retrieves data on a cluster where there is primarily networked connectivity between the computer nodes of the cluster. That is in this type of cluster, the application data are partitioned within the nodes in the cluster so that each node has direct access to physically local disks but must establish network connectivity with other nodes to retrieve files or blocks from remote disks on another node in the cluster.

To retrieve files from a remote resource, software in the host intercepts file or block level I/O requests and determines whether the particular file or block is stored locally or remotely. If local, the software passes the request down to the local file system or block I/O driver. If remote, the software passes the request to the node owning the remote disk via the inter-node communication network.

The key benefit of logically shared disk architecture is the ability to scale the number of nodes by simple replication of the required subsystems. Unlike the physically shared disk architecture that requires complex switches and multiplexing devices, the logically shared disk architecture enables simple and inexpensive scaling of the cluster capacity and size, since any-to-any connectivity between computer nodes and disks need not be maintained. Additional storage devices are accessed by non-local computers of the cluster via existing network interfaces interconnecting the computers of the cluster. In like manner, each additional computer has access to all storage in the cluster either locally or via existing network connections among the computers of the cluster.

Physically shared disk architectures are most prevalent in spite of the higher costs in view of their higher performance as compared to logically shared disk architectures. Many environments therefore have significant investments in application programs and associated "middleware" (intermediate layers of software) which are designed presuming the simple, flexible, any-to-any connectivity of physically shared disks.

"I/O shipping" is a technique that has evolved to allow such application programs and middleware to operate in an environment that in fact does not provide physically shared disks. Rather, I/O shipping methods are used to emulate the physically shared disk architecture using a low-level layer of host software. In essence, I/O shipping is a technique to implement logically shared disks even though any-to-any connectivity does not exist.

I/O shipping is presently performed at a block driver layer of the host software to preserve the simplicity of management of physically shared disks while enjoying the economic and scalability benefits of the logically shared disk architecture. I/O shipping receives block level requests from higher layers of software, which presume an any-to-any connection architecture underlies their operation. The I/O shipping layer processes I/O requests locally if the local disks are appropriate for the requested action and passes the I/O request to other host systems if the requested blocks are not stored on the local disk. I/O shipping thus allows continued use of existing software that presumes physically shared disks to work in a cluster with logically shared disks. That is, I/O shipping determines whether the block request made by a higher level application, that assumes all disks are physically shared, can be retrieved locally or must be retrieved remotely and therefore require the I/O request be "shipped" to another host computer. To higher level software layers I/O shipping in essence emulates physically shared disk using logically shared disks.

All the above known cluster configurations suffer from a common problem in that the disk sharing control and coordination is performed within the host systems and therefore imposes an overhead load on the host systems. The degree of overhead processing varies somewhat depending upon the specific architecture employed. Nevertheless, all the above noted prior techniques impose a significant overhead-processing load on the computers of the cluster. Consequently, a need exists for an improved apparatus and method to provide cluster computing disk sharing (or more generally resource sharing) with high I/O throughput performance, low host system processing overhead, and lower cost/complexity as compared to prior host-based techniques.

SUMMARY OF THE INVENTION

The present invention solves the above and other problems, thereby advancing the useful arts, by providing apparatus and methods for I/O shipping of block level requests to peer intelligent host bus adapters (hereinafter referred to as "HBA"). An HBA in general is a device which adapts (connects) a host computer system to an I/O device. Signals associated with the bus of the host computer system (e.g., PCI, ISA, etc.) are adapted for exchange with a bus specific to the I/O device (e.g., SCSI, Fibre Channel, LAN, etc.). The HBA of the present invention contains a directory within memory for storing location information regarding blocks of data stored within the plurality of storage devices in the cluster, and circuits and software for searching the directory to determine whether to locally or remotely retrieve blocks of data. Independent of the host, the HBA distributes I/O block requests to the appropriate HBA in response to the directory search. The HBA is operable to establish and maintain communications with at least one other host bus adapter to query and request another host bus adapter to retrieve and transfer I/O requested data blocks from a storage subsystem within said clustered computing network.

In accordance with the preferred embodiment, intelligent HBA(s) in each node communicate among themselves as peers. HBAs in the same system can communicate as peers over the system's PCI bus in accordance with the intelligent I/O standard (hereinafter referred to as the $I_2O$ standard). Similarly, HBAs in different nodes can communicate as peers via, for example, a Fibre Channel backbone that interconnects the HBAs.

In the preferred embodiment, an HBA is connected to a peer HBA via a Fibre Channel backbone. The Fibre Channel backbone is a high-speed communication medium and is used to "ship" block level I/O requests for blocks of stored data among the HBAs and to exchange blocks of stored data associated with the shipped I/O requests. In essence, HBA intelligence and peer-to-peer communications enable I/O shipping functionality to be removed from the host and executed by the HBA. The I/O shipping is occurring over a Fibre Channel backbone, thereby relieving congestion on any other network used for inter-processor communication.

The intelligent HBA(s) of the present invention process I/O requests received from the host system. In the preferred embodiment, one HBA is utilized in each node to support the local and remote storage channels of a node. In a second embodiment, one HBA supports the local storage channels and a second HBA supports the remote storage channels within a node. In this second embodiment, the I/O request processing is distributed between the HBAs within the node to thereby reduce the workload on both HBAs within the node.

In the preferred embodiment, an HBA receives a block I/O request from the host and searches through the directory in HBA memory to determine whether the block can be found locally or remotely. If the search through the directory does not find a particular data block, the HBA may poll (e.g. query) peer HBAs to determine which HBA can satisfy a particular block I/O request.

If blocks are available remotely, then the initiating HBA establishes communications with its peer HBA residing in the node containing the requested data blocks (e.g., peer-to-peer communications among HBAs). The I/O request is "shipped" to the peer HBA, which performs the requisite processing. Data returned from the HBA performing the remote processing (i.e., a read request) is passed by the initiating HBA to the requesting host. Otherwise, the initiating HBA retrieves the requested data blocks from the local disks.

According to the present invention, a mapping of the location of data, within every storage subsystem in the cluster, is performed by each HBA. Each HBA maps the location of data within its local storage system thereby building a directory containing the location of all locally stored data blocks. In the preferred embodiment, each HBA uses peer-to-peer capabilities to communicate the contents of its directory to peer HBAs. Each HBA updates its directory to include the communicated information.

As distinguished from known techniques, the present invention virtually eliminates host system overhead while enabling host applications to assume there is full "any-to-any" connectivity to all disks in the cluster (e.g., logically shared disks architecture). The present invention provides such flexibility through I/O shipping emulation of physically shared disks but implements the I/O shipping layer within the HBAs of the clustered computers, rather than in the host. Implementing I/O shipping within the HBA virtually eliminates overhead resulting from processing I/O requests within the host systems previously imposed when sharing storage resources. That is, the host software no longer has to handle the I/O shipping function, and inter-processor communication networks no longer need to carry I/O traffic in addition to communication traffic.

Performance is further enhanced in that each intelligent HBA can provide disk caching of the local disks under its control, and can service hits out of this cache regardless of whether the requesting host is local or remote. This is in contrast to physically shared disks where the cache must reside out in the subsystem to avoid the cache flushes or complex cache synchronization issues associated with "distributed" cache architectures.

Furthermore, I/O shipping emulation of physically shared disks reduces cost and complexity as compared to actual physically shared disks. Costly complex multiplexors and switches are not required to implement any-to-any connectivity.

It is therefore an object of the present invention to provide apparatus and associated methods of operation for performing I/O shipping within HBAs of computers in a clustered computing environment.

It is a further object of the present invention to provide apparatus and associated methods of operation for performing I/O shipping within HBAs of computers in a clustered computing environment to emulate physically shared disks on logically shared disks.

It is still a further object of the present invention to provide apparatus and associated methods of operation for performing I/O shipping to distribute low level block I/O requests within HBAs to process both local and remote block I/O requests.

It is yet a further object of the present invention to provide apparatus and associated methods of operation for establishing peer-to-peer communications that is transparent to the host by providing an intelligent HBA to establish peer-to-peer connections to distribute block I/O requests.

It is another object of the present invention to provide apparatus and associated methods of operations for establishing peer-to-peer communications that is transparent to the host by providing a single HBA to support a node's local and remote storage channels.

It is yet another object of the present invention to provide apparatus and associated methods of operations for establishing peer-to-peer communications that is transparent to the host by providing separate HBAs to support the local and remote storage channels within a node.

The above and other objects, aspects, features, and advantages of the present invention will become apparent from the following description and the attached drawings.

BRIEF DESCRIPTION OF THE DRAWINGS

FIGS. 5A and 5B, in combination, are a block diagram of a second embodiment of the present invention.

DETAILED DESCRIPTION OF THE PREFERRED EMBODIMENTS

Figure 1:
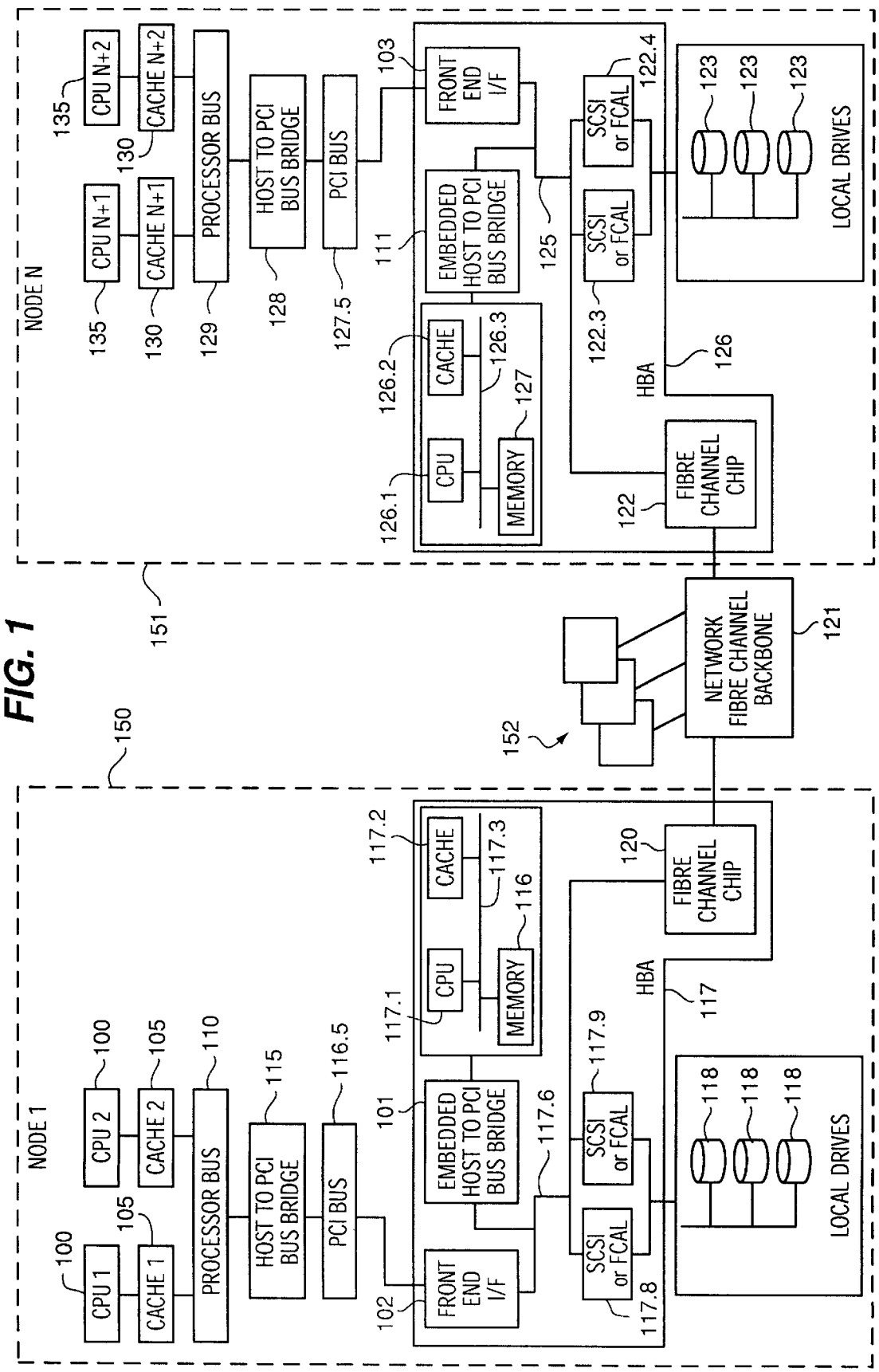
FIG. 1 is a block diagram of a host system in which the present invention may be advantageously applied.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 depicts a host system in which the present invention may be advantageously applied. Node 1 150 includes a host system connected to a HBA 117 via a Host-to-Peripheral Component Interconnect (hereinafter referred to as "PCI") bus bridge 115 and PCI bus 116.5. The host system includes one or more Central Processing Units (hereinafter referred to as "CPU"). Host system CPU 1 and CPU 2 100 are connected to respective cache 1 and cache 2 105 as well as to other memory components not shown. The host processors, CPU 1 and CPU 2 100 are connected to local processor bus 110. Those skilled in the art will recognize that local processor bus 110 may be any of several busses depending upon the choice of components for host CPU 1 and CPU 2 100.

In the present invention, the Host-to-PCI Bus bridge 115 adapts the processor bus 110 signals and the PCI bus 116.5 signals to allow communications with the embedded HBA intelligence. An exemplary Host-to-PCI Bus bridge 115 is the "Saturn II" chip set manufactured as part number 82420 by Intel Corporation. Those skilled in the art will recognize other processor/PCI interface chips well known in the art.

The PCI bus 116.5 is but one example of a presently available, commercially popular bus for peripheral device interconnection in host systems. A PCI bus is commonly used as the host system interface bus due to faster transfer rates as distinguished from older backplane busses such as ISA or EISA. The host system interface bus can be selected based on system performance requirements. Although PCI is the preferred I/O bus standard, one skilled in the art will recognize other I/O bus standards are operable within the present invention, such as EISA, MicroChannel, etc.

Host bus adapter (HBA) 117 has embedded intelligence that allows it to function as an intelligent PCI-to-PCI bridge and as a disk drive controller for local disks 118. The front-end interface 102 is a PCI-to-PCI Bus bridge that connects, via PCI bus 117.6, various peripheral I/O devices, such as the local drives 118 and Fibre Channel Chip 120, to a centralized system PCI bus 116.5. Front-end interface 102 is connected to embedded Host-to-PCI Bus bridge 101 via PCI bus 117.6. The Host-to-PCI Bus bridge 101 adapts the PCI bus 117.6 signals and internal bus 117.3 signals to allow communications with the embedded HBA intelligence.

HBA 117 also includes a CPU 117.1, local memory 116, and cache memory 117.2, which are connected by internal processor bus 117.3. One skilled in the art will recognize the internal processor bus depends on the processor chosen to comply with design requirements, such as speed. In the preferred embodiment, the HBA's internal bus 117.3 is designed to support high data transfer rates.

Local memory 116 stores the program instructions and variables for the operation of CPU 117.1. Local memory 116 can be for example, ROM, flash memory, or other memory storage mediums with fast access rates, such as RAM.

Although cache memory 117.2 is smaller than main storage, such as, disk drives 118 or other permanent storage devices, information within cache memory 117.2 can be accessed much faster than information within disk drives 118. To improve I/O performance, CPU 117.1 temporarily caches disk data in cache memory 117.2 that is frequently accessed. Later, the CPU 117.1 stores the data permanently in the slower disk drive devices 118. One skilled in the art will recognize local memory 116 and cache memory 117.2 can exist within the same physical memory. Additionally one skilled in the art will recognize CPU 117.1 may have its own processor cache (not shown) to store frequently accessed CPU data. If RAM is utilized as local memory 116 or cache memory 117.2, the RAM can be battery-backed to make the data non-volatile.

As shown in FIG. 1, one HBA services the I/O requests from CPU 1 and CPU 2 100. One skilled in the art, however, will recognize the load sharing benefits of allowing a plurality of HBAs to service the local and remote I/O requests of CPU 1 and CPU 2 100. As a node expands its processing power by adding CPU's, additional HBAs may be required to service the additional local and remote I/O requests. One skilled in the art will recognize HBA 117 may be implemented in one or more integrated circuits, and the HBA can consist of multiple processing elements and/or memory elements per HBA performance and feature/function requirements. For example, a primary processing element may be used for most HBA functions, while one or more specialized co-processors may handle specific functions such as data movement and RAID parity calculations.

The HBA interfaces and controls the local drives 118 via HBA interface 117.8 and 117.9. These interfaces are for example, small computer system interface (SCSI) or Fibre Channel Arbitrated Loop (FCAL). A person skilled in the art will recognize the interface utilized depends upon the bus used to connect the plurality of local disks 118.

One skilled in the art will recognize that there are various methods utilized to manage local drives 118. The HBA contains the intelligence to manage a single local disk 118 or a plurality of local disks 118 as an array. If the local drives 118 are configured as an array, Redundant Array of Inexpensive Disks (RAID) management, for example, can be used to improve the performance and reliability of the local disks 118. There are several different methods to implement RAID. For example, RAID level 1 protects stored data by duplicating the stored data and storing the original data and duplicated data on separate disks. Another implementation of RAID, RAID level 5, distributes data across multiple data disks in the array to improve performance and provide for a block (or multiple blocks) of redundancy information (e.g., parity) that is distributed over the disk drives. For a more in depth discussion of RAID, the reader is directed to *The RAID book*, (Paul Massiglia ed., The RAID Advisory Board, 5th ed. 1996).

In the present invention, each CPU within Node 150, Nodes 152, and Node N 151 does not have direct connectivity to a peer CPU within another node. For example, CPU 1 100 does not communicate directly with CPU N+1 135 in Node N 151. Instead, Node 150, Nodes 152, and Node N 151 are connected via a network communications medium. In the preferred embodiment, a Fibre Channel backbone 121 allows each CPU to be connected to peer CPU's. One skilled in the art will recognize all node-to-node inter-processor communication can occur on this Fibre Channel backbone 121. Alternatively, the Fibre Channel backbone 121 can be used exclusively for storage communications and inter-processor communications can occur over a separate network. One skilled in the art will recognize other connectivity standards besides Fibre Channel can be used.

Fibre Channel Chip 120 connects Node 1 150 to the rest of the clustered environment via the network Fibre Channel backbone 121. The Fibre Channel backbone is a high-speed communication medium and provides numerous advantages. In particular, there are no complex routing algorithms to compute when sending data from a first Fibre Channel port to a second Fibre Channel port. Fibre Channel makes use of unique addresses to connect to other processors or peripherals. The Fibre Channel port only needs to manage the point-to-point connection between the device and the backbone fabric. There are three classes of service available through the Fibre Channel backbone: dedicated service, switched service without a dedicated connection but providing guaranteed delivery with an acknowledgment of receipt, and connectionless service without acknowledgment of receipt.

The Fibre Channel backbone supports the following topologies: point-to-point, arbitrated loop, or switched. The transmission (e.g. class of service) of data is isolated from the underlying fabric topology (ex. crosspoint switches, point-to-point, or loops) and it is the fabric that decides how to communicate between differing topologies by trading information on attributes and characteristics. For a more in depth discussion of Fibre Channel, the reader is directed to *Fibre Channel Connection to the Future* (Carol Lewis ed., Fibre Channel Association, 1994).

Node N 151 is similar to Node 1 150. According to the present invention, Node N 151 includes CPU N+1 and CPU N+2 135 connected to respective caches N+1 and N+2 130. Processor bus 129 connects hosts CPU N+1 and CPU N+2 135. As required in Node 1 150, the internal processor bus 129 depends on the processor chosen to comply with design requirements.

The Host-to-PCI Bus bridge 128 adapts the processor bus 129 signals to the PCI bus 127.5 standards. HBA 126 connects to the Host-to-PCI Bus bridge 128 via PCI bus 127.5.

HBA 126 includes a processor subsystem, embedded Host-to-PCI Bus bridge 111, front-end interface 103, SCSI or FCAL interfaces 122.3, 122.4, and Fibre Channel Chip 122. The processor subsystem comprises CPU 126.1, cache 126.2, and local memory 127 connected via internal processor bus 126.3. Embedded Host-to-PCI Bus bridge 111 adapts PCI bus 125 signals and internal processor bus 126.3 signals to allow communications with the embedded intelligence. In the preferred embodiment, HBA 126 internal bus 126.3 is designed to support high data transfer rates.

Front-end interface 103 is a PCI-to-PCI Bus bridge that connects peripheral I/O devices, such as local drives 123, to centralized PCI bus 127.5. SCSI or FCAL interfaces 122.3, 122.4 and Fibre Channel Chip 122 connect to front-end interface 103 via PCI bus 125. The SCSI or FCAL interfaces 122.3, 122.4 interfaces may be SCSI or FCAL depending upon the internal bus utilized to connect local disks 123.

In the preferred embodiment, each HBA in Node 1 150, Nodes 152, and Node N 151 are connected to the Fibre Channel backbone 121 via a Fibre Channel Chip such as 120, 122. The Fibre Channel backbone 121 is used as the physical medium to "ship" the block level I/O requests among the HBAs and to exchange data associated with the shipped I/O requests. In the preferred embodiment, one HBA has the processing power to support the local and remote storage channels of a node. In an alternative embodiment, due to design considerations, such as load balancing, at least one HBA can support the local storage channels and a separate HBA can support the remote storage channels within a node. This alternative embodiment distributes the I/O requests between the HBAs and reduces the workload on both HBAs within the node. FIG. 5A is a block diagram of such an embodiment.

As shown in FIG. 5A, Node 1 150 contains two HBAs 180 and 181. Both HBAs are connected together via PCI bus 116.5. HBA 180 processes I/O requests directed to the local drives 118. HBA 181 supports the remote I/O requests. HBA 181 is connected to the network Fibre Channel backbone 121 via Fibre Channel Chip 120.

HBA 180 has a front-end interface 171, processor subsystem 114, embedded Host-to-PCI Bus Bridge 172, and SCSI or FCAL interfaces 117.8 and 117.9. HBA processor subsystem 114 contains a CPU 114.2, cache 114.3, and local memory 114.4 connected together via processor bus 114.5. Embedded Host-to-PCI Bus bridge 172 is connected to front-end interface 171 via PCI bus 117.4. Embedded Host-to-PCI Bus bridge 172 adapts the PCI bus 117.4 signals and processor subsystem 114 internal bus 114.5 signals to allow communications with the embedded intelligence.

The front-end interface 171 is a PCI-to-PCI Bus bridge that connects, via PCI bus 117.4, various peripheral I/O devices, such as the local drives 118, to centralized PCI bus 116.5. The HBA interface to the local drives 117.8 and 117.9 can be SCSI or FCAL depending upon the bus supporting the local drives.

HBA 181 has a front-end interface 193, processor subsystem 114.1, embedded Host-to-PCI Bus bridge 173, and Fibre Channel Chip 120. The front-end interface 193 is a PCI-to-PCI bus bridge connected to Host-to-PCI Bus bridge 173 via PCI bus 117.5. Host-to-PCI Bus bridge 173 adapts processor bus signals 114.9 and the PCI bus 117.5 signals to allow communications with the embedded intelligence. Front-end interface 193 is connected to Fibre Channel Chip 120 via PCI bus 117.5. HBA processor subsystem 114.1 contains a CPU 114.6, cache 114.7, and local memory 114.8 connected together via processor bus 114.9.

Figure 5B:
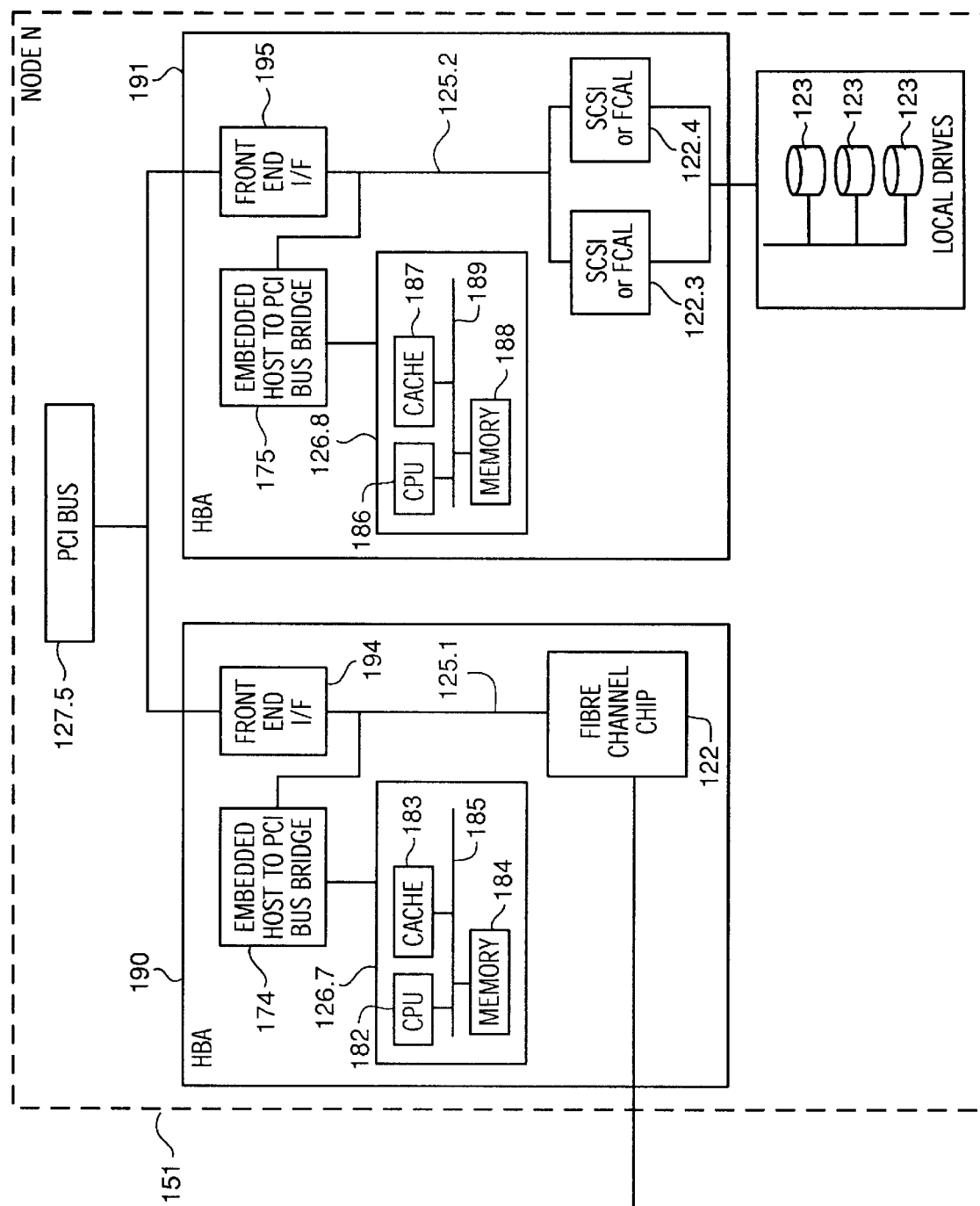

Nodes 152 and Node N 151 are similar to Node 1 150. As shown in FIG. 5B, Node N 151 contains HBA 190 and HBA 191 both connected via PCI bus 127.5. HBA 190 supports the remote 110 requests and is connected to the Fibre Channel Backbone 121 via the Fibre Channel Chip 122. HBA 191 supports the local I/O requests and is connected to local drives 123 via SCSI or FCAL interfaces 122.3 and 122.4.

HBA 190 contains processor subsystem 126.7, front-end interface 194, embedded Host-to-PCI Bus bridge 174, and Fibre Channel Chip 122. The processor subsystem 126.7 contains CPU 182, cache 183, and local memory 184 connected via processor bus 185. Front-end interface 194 is a PCI-to-PCI bus bridge connected to Fibre Channel Chip 122 via PCI bus 125.1 and connected to Host-to-PCI Bus bridge 174 via PCI bus 125.1. Host-to-PCI Bus bridge 174 adapts processor bus 185 signals and the PCI bus 125.1 signals to allow communications with the embedded intelligence.

HBA 191 contains front-end interface 195, embedded Host-to-PCI Bus bridge 175, processor subsystem 126.8, and SCSI or FCAL interfaces 122.3 and 122.4. The front-end interface 195 is a PCI-to-PCI Bus bridge that connects, via PCI bus 125.2, various peripheral I/O devices, such as the local drives 123, to centralized PCI bus 127.5. Front-end interface 195 is connected to SCSI or FCAL interfaces 122.3, 122.4 via PCI bus 125.2. These interfaces can be either SCSI or FCAL depending upon the bus utilized to connect the local drives 123.

Processor subsystem 126.8 contains CPU 186, cache 187, and local memory 188 connected via processor bus 189. Host-to-PCI Bus bridge 175 adapts the processor bus 189 signals and the PCI bus 125.2 to allow communication with the embedded intelligence. Host-to-PCI Bus bridge 175 is connected to front-end interface 195 via PCI bus 125.2.

Host systems and associated HBA(s) communicate in accordance with embedded intelligent software. In the preferred embodiment, the host systems and associated HBA(s) communicate in accordance with the $I_2O$ standard. The $I_2O$ standard is but one example of a presently available, open architecture for developing intelligent device drivers. This protocol allows a HBA to communicate with peer HBAs and hosts independent of the operating system, processor platform, and I/O bus. Use of the $I_2O$ standard in the present invention allows each HBA to have peer-to-peer communications that is transparent to the host. Although the $I_2O$ architecture is preferred, one skilled in the art will recognize other embedded intelligent software is operable within the present invention, such as, IBM Subsystem Control Block Architecture, etc.

The $I_2O$ standard partitions the device driver into one module containing the required operating system specific code (hereinafter referred to as OSM) and a second module containing the required hardware specific code (hereinafter referred to as HDM). Splitting the driver to create stackable drivers enables insertion of intermediate service modules (hereinafter referred to as ISM). The ISM adds further functionality between the OSM and HDM.

Figure 2:
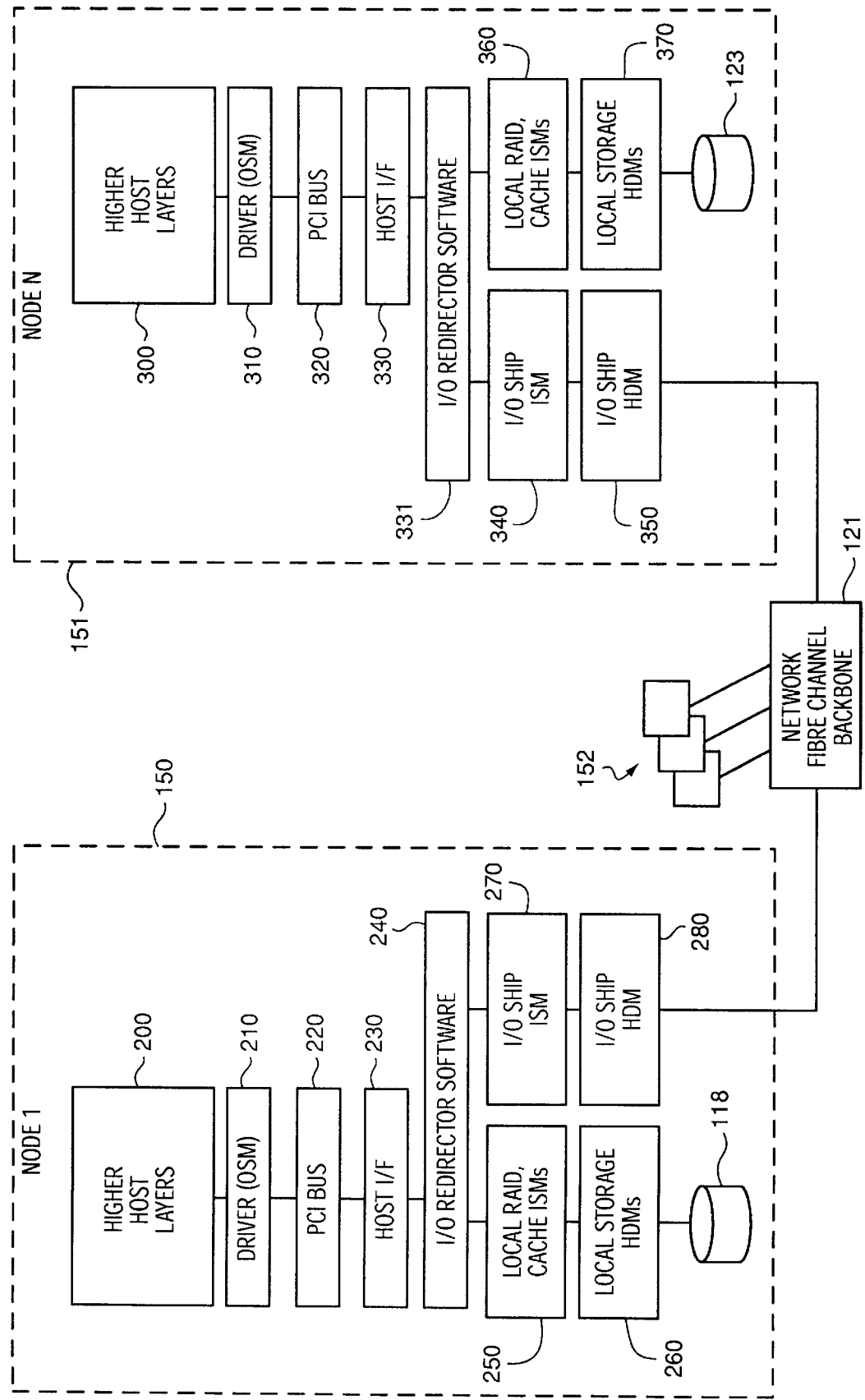
FIG. 2 is a block diagram of the software layers operable within cooperating nodes in accordance with the present invention as shown in FIG. 1.

FIG. 2 is a block diagram of the software layers within the host CPUs 100, 135 and the HBAs 117, 126. Within Node 1 150, host layers 200 contain the collection of software required to operate the host system. Driver layer 210, also referred to as the OSM in the $I_2O$ standard, is the layer required to interface host layers 200 to the intelligent HBA. Host interface layer 230 manages communications between the host and the HBA's embedded intelligence.

Similarly, within Node N 151, host layers 300 contain the software required to operate the host system in Node N 151. Driver layer 310, also referred to as the OSM in the $I_2O$ standard, is the software required to interface the host layer 300 to the intelligent HBA. Host I/F layer 330 manages communications between the host and the HBA's embedded intelligence.

Each HBA 117, 126 contains managing means which includes the "Distributed block I/O redirector driver software" 240, 331 (hereinafter referred to as I/O redirector software), the I/O shipping ISM 270, 340 and the I/O shipping HDM 280, 350. The I/O redirector software 240, 331 provides the means to allow the HBA 117, 126 to make the decision whether to satisfy a block I/O request locally or remotely. The I/O redirector 240, 331 has the means to search a directory which stores the location of local and remote blocks within the cluster's drives. The directory is stored within HBA cache memory. In accordance with the present invention, the managing means coordinates the retrieval of data over a cluster with logically shared disks.

In Node 1 150, Nodes 152, and Node N 151, the HBAs, such as HBA 117 and 126, contains local RAID and cache ISMs 250, 360 and local storage HDMs 260, 370 to control local disks 118, 123 respectively. These modules retrieve and request block level I/O requests from the local disks 118, 123 and post blocks of data to the local disks 118, 123. Local RAID and cache ISM 250, 360 interface with HBA cache memory 117.2, 126.2 to store modified blocks of data prior to posting. If RAID techniques are used to manage the local disks 118, 123 then the RAID and cache ISM 250, 360 contains the software, such as RAID redundancy algorithms, to manage the storage of modified blocks to local disks 118, 123. Although RAID is the preferred disk array management technique, one skilled in the art will recognize that other disk array management techniques may be utilized to manage the local disks 118, 123.

Local RAID and cache ISM 250, 360 employs a variety of well known caching techniques to improve I/O performance of the cluster environment. These caching techniques include write back caching or using log areas to record information, such as new data, new parity, old data, and/or old parity for later processing in parity computations or for later storing to disk. Local storage HDMs 260, 370 manage the SCSI or FCAL interface hardware.

The I/O shipping ISM 270, 340 is part of the managing means and is responsible for sending out I/O requests for directory updates, updating the directory, managing the transmission of locally generated requests for remote data out to the network, and managing the reception of remotely generated requests from the network for local data. I/O shipping HDM 280, 350 manages the Fibre Channel transactions in support of shipping functions of the Fibre Channel Chip 120, 122.

Figure 3:
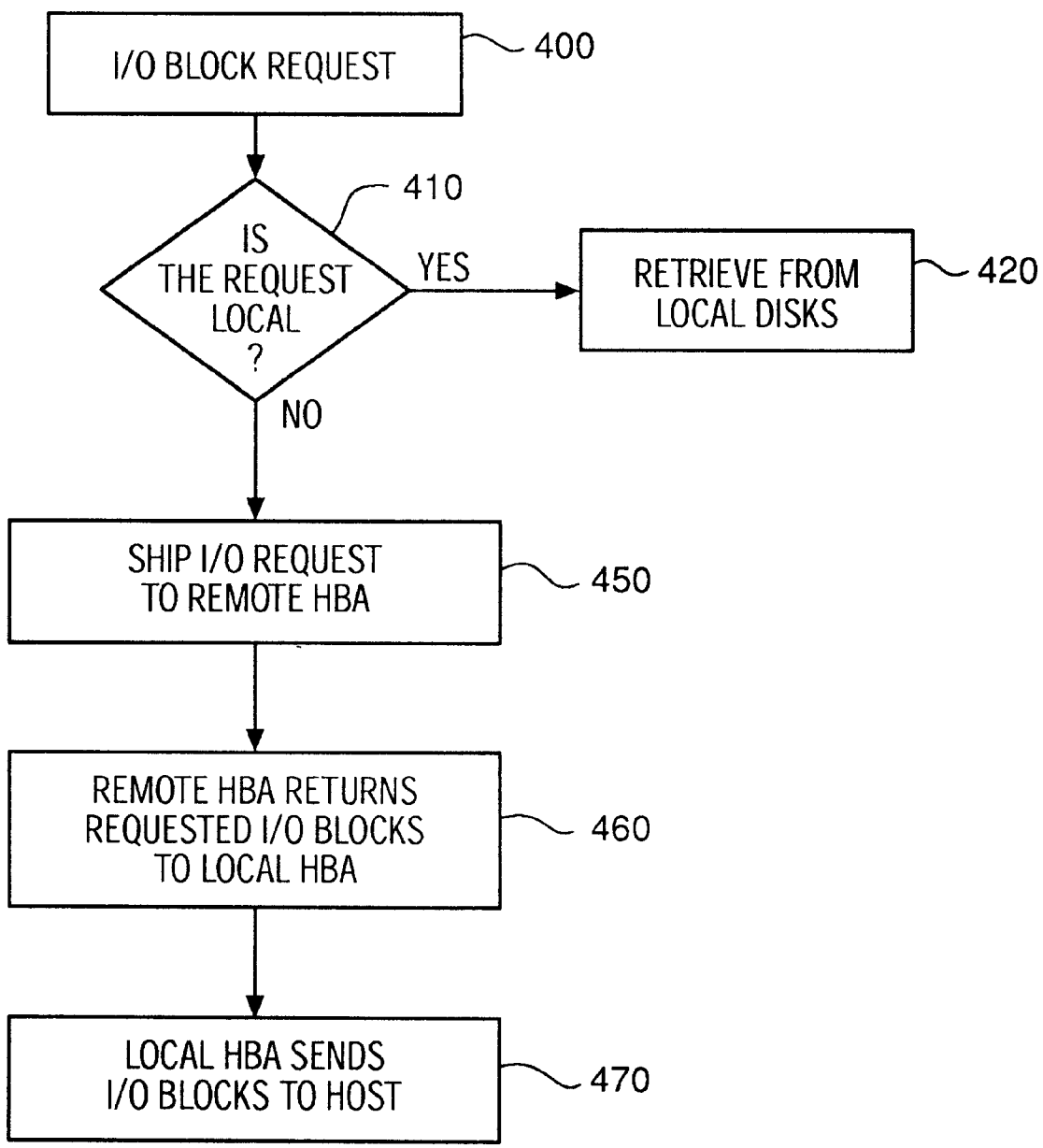
FIG. 3 is a flow chart depicting the process operable within an HBA in accordance with the present invention to retrieve a block locally or remotely.

FIG. 3 is a flow chart depicting the process by which peer-to-peer HBAs retrieve data corresponding to an I/O request for stored data blocks either locally or remotely. After receiving a block I/O request 400, the 110 redirector has the means to search the directory and determining means to locate the local or remote disk drives that are storing the I/O requested blocks 410. If the location of the blocks is local 420, then the blocks are retrieved from the respective local disk drive.

If the requested I/O block is stored in a remote disk, the initiating HBA ships the block I/O request to the peer HBA that the initiating HBA has determined can perform the requisite processing 450. Prior to shipping the I/O block request, communications are established over the Fibre Channel backbone between the initial HBA and the remote HBA attached to the storage location owning the requested I/O blocks. Typically, HBA to HBA communication channels are established during initial system configurations so overhead associated with establishing communication is not incurred on every block request over the Fibre Channel backbone.

The remote HBA retrieves the requested blocks of data from its HBA cache, or if the blocks of data are not within cache, then directly from the remote HBA's local disk. The remote HBA can cache blocks of data retrieved from its local disk, to service future local or remotely generated requests for these blocks. The remote I/O blocks are sent from the HBA performing the remote processing (e.g., a read request) to the initiating HBA 460. The initiating HBA then transfers the I/O blocks to the requesting host 470.

If the search through the directory does not find a particular data block, the HBA queries peer HBAs to determine which HBA can retrieve the particular data block in the block I/O request. The initiating HBA sends a broadcast message to all peer HBAs and awaits for a response from the peer HBA in the node where the data blocks reside in local storage. After the remote HBA responds, the initiating HBA "ships" the block I/O request to the remote HBA. The initiating HBA will update its directory, via its I/O shipping ISM 270, 340, so subsequent requests for that block of data do not incur the latency of the directory query.

Figure 4A:
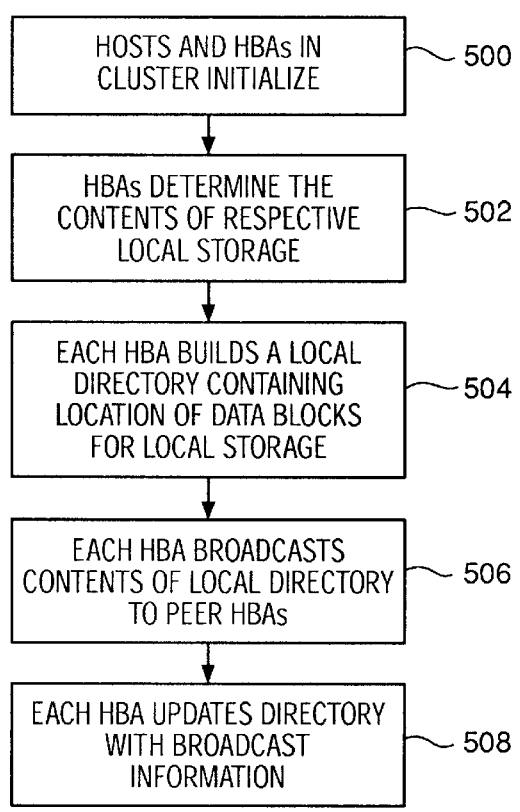
FIGS. 4A–4D are flow charts depicting the alternative, equivalent methods to build the directory for locating requested blocks within an HBA in accordance with the present invention.

The HBA's via I/O redirector 240, 331 has the means to create the directory storing the mapping of the local and/or remote location of blocks within the clustered computing environment. Specifically, the data within each respective local disk is mapped and coalesced into a directory. FIG. 4A shows the preferred method to build the directory.

After the host(s) and HBA(s) initialize 500, the HBAs map the location of blocks within their respective local storage subsystem 502. The HBAs build a local directory containing the mapped location information for their respective local storage subsystem 504. The HBAs use their peer-to-peer capabilities to broadcast the contents of their directory to peer HBAs 506 and each HBA updates its respective directory with the broadcast information 508.

Figure 4B:
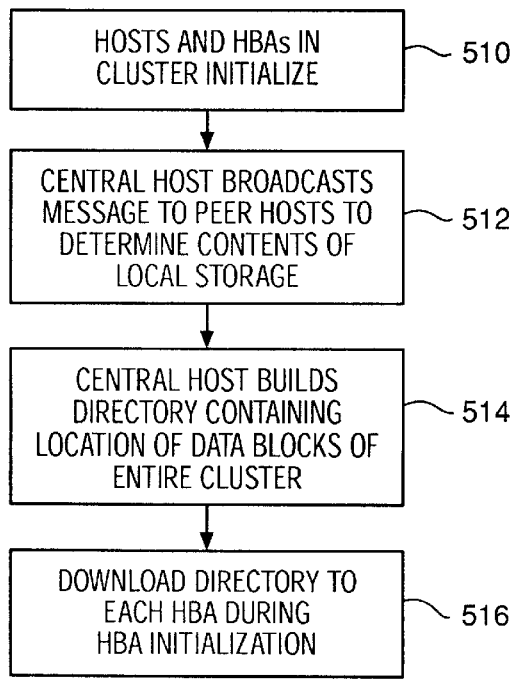

FIG. 4B shows an alternative embodiment. After the hosts initialize 510, one host CPU is determined to be the central host. The central host transmits a broadcast message, to peer hosts, requesting addressing information regarding the blocks stored in all of the local storage subsystems 512. The central host collects the information sent by the peer hosts, coalesces this collected information, and builds a directory mapping the location of blocks in the entire cluster 514. This directory information is downloaded to each HBA while the HBAs initialize 516.

Figure 4C:
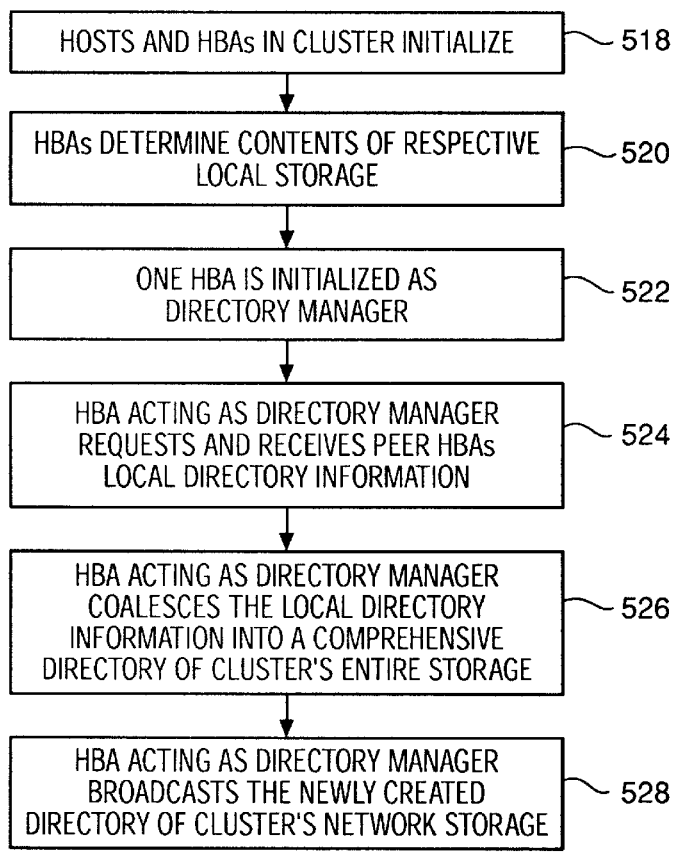

In FIG. 4C, one HBA is utilized as a central HBA directory manager to receive directory information from all peer HBAs, coalesce all this directory information, and then transmit the newly composed directory to all peer HBAs. After the hosts and HBAs in the cluster initialize 518, the HBAs map the contents of the respective local storage subsystem 520. One HBA is chosen as directory manager 522. The HBA acting as directory manager demands local directory information from peer HBAs using peer-to-peer communications 524. The HBA acting as directory manager coalesces and builds a comprehensive directory containing the location of data blocks throughout the cluster's entire network storage using the peer HBAs local directory information 526. The HBA acting as directory manager broadcasts the newly created directory of the cluster's network storage 528.

Figure 4D:
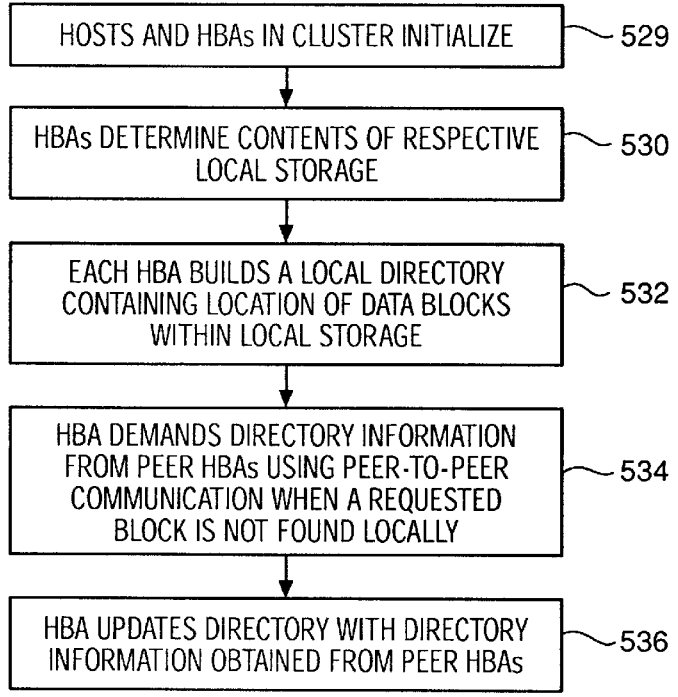

In FIG. 4D, after the hosts and HBAs in the cluster initialize 529, the HBAs determine the contents of the respective local storage subsystem 530 and each HBA builds a local directory 532. The HBA demands directory information from peer HBAs using peer-to-peer communications when an I/O requested data block is not found within the local directory 534. In this embodiment, the HBA updates its local directory with the directory information obtained from peer HBAs 536, so subsequent requests for that particular block of data do not have to incur the latency of this directory update.

Algorithms for searching the directory for a particular block of data are well known in the art and described in texts on sorting and searching algorithms. See, for example, Donald E. Knuth, 3 *The Art of Computer Programming* (Addison-Wesley Publishing, Co. 1973). A person skilled in the art will recognize that the directory can be searched using a simple sequential search, a hierarchical search using a binary search, or other searching algorithms. Alternatively, the directory can be implemented as a hash table with hash computations operable to locate a block of data in the directory.

A person of ordinary skill in the art will further recognize the desirability to separate the directory into two portions for performance enhancement: a first portion of the directory contains a map of the data blocks within the local storage subsystem, and a second portion of the directory contains a map of the data blocks within remote storage subsystems. Typically the portion identifying locally stored blocks will be smaller than the second portion and may therefore be searched more quickly. An HBA utilizing this alternative directory first searches the local portion, and if the particular block is not found in the local portion, then the HBA searches the portion containing the location of data blocks in the remote storage subsystems. If the storage location of a particular block is not found in either portion of the directory, then the HBA may use peer-to-peer communications to determine the HBA that manages the storage subsystem storing the particular block.

Furthermore, a person skilled in the art will recognize the benefits to having the HBA cache 117.2, 126.2 battery-backed. Thereby making the HBA cache memory essentially non-volatile to power failures.

Changes to the directory can occur due, for example, to the creation or deletion of blocks. When blocks are created or deleted within a node's local disk, the HBA, via I/O redirector 240, 331, has the means to update its own local directory to include the created blocks and delete the location of deleted blocks. Furthermore, the HBA, via 110 redirector 240, 331 has the means to update its own local directory when the block of data is not posted to its original location within the local disk. In this case, the HBA determined that another location within the local disk is more mechanically or electrically convenient, such as, in a log structured storage system.

Due to network congestion considerations, the HBAs can wait to broadcast the contents of the updated directory until a peer HBA queries, that is, demands directory information because a requested block is not found in the local directory. At this time, the requesting HBA can update its directory in accordance with the broadcast messages from peer HBAs. This alternative alleviates possible network congestion due to the number of HBAs transmitting broadcast messages regarding modifications in the directories.

As previously discussed, the present invention provides the ease of interfacing with existing high-level host layers that expect a physically shared disk architecture underlying their operation. However, the present invention provides this emulated interface with little or no overhead processing imposed on the host systems of the cluster. Further, the present invention provides the economic benefits of emulating physically shared disks, rather than an actual shared disk implementation, to permit easier, less costly scaling of the clustered environment.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In a clustered computing network having a plurality of computers connected to a plurality of storage devices through a plurality of adapters, a system for shipping of I/O requests including:

a communication medium interconnecting said plurality of adapters for peer to peer communication therebetween;

a directory stored in a memory within at least one of said plurality of adapters for storing location information regarding blocks of data stored within said plurality of storage devices; and managing means operable within said at least one adapter of said plurality of adapters and associated with said communication medium and with said directory for selecting which of said plurality of adapters should process a received I/O request from one of said plurality of computers and for shipping said received I/O request via said communication medium to another of said plurality of adapters in response to the selection, wherein said managing means is operable within said at least one adapter independent of said plurality of computers and is operable to ship a received I/O request to said another of said Plurality of adapters transparently with respect to said plurality of computers.

2. The system of claim 1 wherein said managing means includes:

updating means within said at least one adapter for revising said directory with information regarding the location of blocks of data within at least one of said plurality of storage devices.

3. The system of claim 2 wherein said updating means is operable for updating said directory in response to receiving location information from said plurality of adapters regarding blocks of data.

4. The system of claim 1 wherein said directory includes:

a local portion corresponding to data stored in a portion of said plurality of storage devices connected to said one of said plurality of adapters; and a remote portion corresponding to a portion of said plurality of storage devices connected to others of said plurality of adapters.

5. The system of claim 4 wherein said managing means includes:

searching means to search said local portion and said remote portion of said directory to select which of said plurality of adapters should process the received I/O request;

first determining means for deciding whether said at least one adapter can process the received I/O request in response to said searching means locating the requested blocks in said local portion; and second determining means for deciding whether another of said plurality of adapters can process the received I/O request in response to said searching means locating the requested blocks in said remote portion and in response to said first determining means.

6. The system of claim 1 wherein said storage devices include disk arrays.

7. The system of claim 6 wherein said storage devices further include RAID management means to store data and redundancy information.

8. The system of claim 1 wherein at least one computer of said plurality of computers creates said directory and distributes said directory to said plurality of adapters.

9. The system of claim 8 wherein said system further comprises:
updating means in said at least one computer to update said directory and to distribute the updated directory to said plurality of adapters.

10. The system of claim 1 wherein said at least one of said plurality of adapters creates said directory and distributes said directory to others of said plurality of adapters.

11. The system of claim 10 wherein said managing means further comprises:
updating means to update said directory and to distribute the updated directory to others of said plurality of adapters.

12. A method for shipping of data block I/O requests among a plurality of adapters which connect a plurality of storage devices to a plurality of computers in a clustered computer network, said method comprising the steps of:
determining, within said plurality of adapters, which of said plurality of adapters should process a received I/O request from one of said plurality of computers; and
communicating among said plurality of adapters via said communication medium to ship said received I/O request from one of said plurality of adapters to another of said plurality of adapters for processing,
wherein the method is operable within said plurality of adapters independent of said plurality of computers and is operable to ship a received I/O request to said another of said plurality of adapters transparently with respect to said plurality of computers.

13. The method of claim 12 wherein the step of determining includes the step of:
searching a directory, within said plurality of adapters, that includes location information regarding blocks of data within said plurality of storage devices.

14. The method of claim 13 wherein said directory includes a local portion corresponding to data stored in a portion of said plurality of storage devices connected to said one of said plurality of adapters and a remote portion corresponding to a portion of said plurality of storage devices connected to others of said plurality of adapters, and wherein the step of searching includes the steps of:
searching said local portion to determine whether said one of said plurality of adapters can process said I/O request; and
searching said remote portion to determine whether another of said plurality of adapters can process said I/O request in response to the determination that said one of said plurality of adapters cannot process said I/O request.

15. The method of claim 12 further including the step of:
creating a directory which maps the location of blocks of data within at least one of said plurality of storage devices.

16. The method of claim 15 wherein the step of creating a directory further includes the step of:
distributing said directory to said plurality of adapters.

17. The method of claim 16 wherein the step of creating a directory further includes the steps of:
coalescing information regarding the location of blocks of data within said plurality of storage devices; and
building said directory using said coalesced information.

18. A system for I/O shipping of an I/O request comprising:
a plurality of host adapters for connecting at least one host computer that generates said I/O request to at least one I/O device;
a communication medium interconnecting said plurality of host adapters, wherein said plurality of host adapters connect said at least one host computer to said communication medium; and
shipping means within said plurality of host adapters and coupled with said communication medium, for shipping said I/O request to an identified one of said plurality of host adapters via said communication medium,
wherein said shipping means is operable within said plurality of adapters independent of said at least one host computer and is operable to ship a received I/O request to said identified one of said plurality of adapters transparently with respect to said at least one host computer.

19. The system of claim 18 wherein said shipping means includes:
a directory mapping the location of data in I/O devices of said at least one I/O device associated with said plurality of host adapters; and
search means, coupled with said directory, for searching said directory to locate data requested by said I/O request to thereby identify said identified one of said plurality of host adapters capable of processing said I/O request.

20. The system of claim 19 wherein said directory includes:
a local portion corresponding to data stored in a portion of said at least one I/O device connected to a corresponding one of said plurality of host adapters; and
a remote portion corresponding to a portion of said plurality of said at least one I/O device connected to others of said plurality of host adapters.

21. The system of claim 20 wherein said search means includes:
searching means, within at least one adapter of said plurality of host adapters, for searching said local portion and said remote portion of said directory to select which of said plurality of host adapters should process said I/O request;
first determining means for deciding whether said at least one adapter can process the I/O request in response to said searching means locating the requested blocks in said local portion; and
second determining means for deciding whether another of said plurality of host adapters can process the I/O request in response to said searching means locating the requested blocks in said remote portion and in response to said first determining means.

22. A clustered computer network, comprising:
a first node, including:
a first host computer with a first processor bus;
a first bus bridge connected to said first processor bus;
a first host bus adapter;
a first peripheral bus connected to said first bus bridge and said first host bus adapter, wherein said first bus bridge and said first peripheral bus provide communication between said first host computer and said first host bus adapter; and a first storage device that is accessed by said first host bus adapter;

a second node, remote to said first node, including:
a second host computer with a second processor bus;
a second bus bridge connected to said second processor bus;
a second host bus adapter;
a second peripheral bus connected to said second bus bridge and said second host bus adapter, wherein said second bus bridge bus and said second peripheral bus provide communication between said second host computer and said second host bus adapter; and
a second storage device that is accessed by said second host bus adapter; and an adapter communication medium that provides communication between said first and second host bus adapters, wherein said first host bus adapter routes I/O requests from said first host computer for said first storage device to said first storage device and ships I/O requests from said first host computer for said second storage device across said adapter communication medium to said second host bus adapter independent of said first host computer, thereby relieving said first host computer of determining which of said storage devices said I/O requests from said first host computer are directed to, and said second host bus adapter routes I/O requests from said second host computer for said second storage device to said second storage device and ships I/O requests from said second host computer for said first storage device across said adapter communication medium to said first host bus adapter independent of said second host computer, thereby relieving said second host computer of determining which of said storage devices said I/O requests from said second host computer are directed to wherein the shipping of I/O requests is transparent with respect to said first host computer and said second host computer.

23. The network of claim 22 further including a computer communication medium that provides communication between said first and second host computers, wherein said computer communication medium does not provide communication between said first and second host bus adapters, and said adapter communication medium does not provide communication between said first and second host computers.

24. The network of claim 22 wherein said first storage device includes a first array of disk drives, and said second storage device includes a second array of disk drives.

25. The network of claim 22 wherein said first and second host bus adapters communicate with one another in accordance with an $I_2O$ protocol.

26. The network of claim 22 wherein said first host bus adapter responds to said I/O requests from said second host adapter by enabling said second host adapter to logically share said first storage device, and said second host bus adapter responds to said I/O requests from said first host bus adapter by allowing said first host bus adapter to logically share said second storage device.

27. The network of claim 22 wherein
said first host bus adapter permanently physically owns said first storage device for I/O requests in said network for said first storage device and permanently logically shares said second storage device for I/O requests from said first host computer for said second storage device; and said second host bus adapter permanently physically owns said second storage device for I/O requests in said network for said second storage device and permanently logically shares said first storage device for I/O requests from said second host computer for said first storage device.

28. The network of claim 22 wherein
said first host computer includes first processors, said first processor bus provides communication between said first processors, and said first peripheral bus provides communication between said first processors and said first host bus adapter without providing communication between said first processors; and said second host computer includes second processors, said second processor bus provides communication between said second processors, and said second peripheral bus provides communication between said second processors and said second host bus adapter without providing communication between said second processors.

29. The network of claim 22 wherein
said first host bus adapter consists essentially of a first peripheral bus interface for interfacing with said first peripheral bus, a first internal bus connected to said first peripheral bus interface, a first internal bus bridge connected to said first internal bus, a first internal processor bus connected to said first internal bus bridge, a first central processing unit and a first memory connected to said first internal processor bus, a first storage device interface connected said first internal bus for interfacing with said first storage device, and a first adapter communication medium interface connected to said first internal bus for interfacing with said adapter communication medium; and said second host bus adapter consists essentially of a second peripheral bus interface for interfacing with said second peripheral bus, a second internal bus connected to said second peripheral bus interface, a second internal bus bridge connected to said second internal bus, a second internal processor bus connected to said second internal bus bridge, a second central processing unit and a second memory connected to said second internal processor bus, a second storage device interface connected said second internal bus for interfacing with said second storage device, and a second adapter communication medium interface connected to said second internal bus for interfacing with said adapter communication medium.

30. The network of claim 22 wherein
said first host bus adapter includes a first routing host bus adapter for routing I/O requests for said first data storage device to said first data storage device, and includes a first shipping host bus adapter for shipping I/O requests from said first host computer for said second storage device to said second host bus adapter via said adapter communication medium and for transferring I/O requests from said second host bus adapter via said adapter communication medium to said first routing host bus adapter for transfer to said first storage device; and said second host bus adapter includes a second routing host bus adapter for routing I/O requests for said second data storage device to said second data storage device, and includes a second shipping host bus adapter for shipping I/O requests from said second host computer for said first storage device to said first host bus adapter via said adapter communication medium and for transferring I/O requests from said first host bus adapter via said adapter communication medium to said second routing host bus adapter for transfer to said second storage device.

31. The network of claim 30 wherein said first routing host bus adapter consists essentially of a first routing peripheral bus interface for interfacing with said first peripheral bus, a first routing bus connected to said first routing peripheral bus interface, a first routing bus bridge connected to said first routing bus, a first routing processor bus connected to said first routing bus bridge, a first routing central processing unit and a first routing memory connected to said first routing processor bus, and a first routing storage device interface connected to said first routing bus for interfacing with said first storage device;

said first shipping host bus adapter consists essentially of a first shipping peripheral bus interface for interfacing with said first peripheral bus, a first shipping bus connected to said first shipping peripheral bus interface, a first shipping bus bridge connected to said first shipping bus, a first shipping processor bus connected to said first shipping bus bridge, a first shipping central processing unit and a first shipping memory connected to said first shipping processor bus, and a first shipping adapter communication medium interface connected to said first shipping bus for interfacing with said adapter communication medium;

said second routing host bus adapter consists essentially of a second routing peripheral bus interface for interfacing with said second peripheral bus, a second routing bus connected to said second routing peripheral bus interface, a second routing bus bridge connected to said second shipping bus, a second routing processor bus connected to said second routing bus bridge, a second routing central processing unit and a second routing memory connected to said second routing processor bus, and a second routing storage device interface connected to said second routing bus for interfacing with said second storage device; and said second shipping host bus adapter consists essentially of a second shipping peripheral bus interface for interfacing with said second peripheral bus, a second shipping bus connected to said second shipping peripheral bus interface, a second shipping bus bridge connected to said second shipping bus, a second shipping processor bus connected to said second shipping bus bridge, a second shipping central processing unit and a second shipping memory connected to said second shipping processor bus, and a second shipping adapter communication medium interface connected to said second shipping bus for interfacing with said adapter communication medium.

* * * * *